(12) United States Patent
Tione

(10) Patent No.: US 11,772,495 B2
(45) Date of Patent: Oct. 3, 2023

(54) METHOD AND SYSTEM FOR CONTROLLING AND RECOVERING ADHESION OF THE WHEELS OF A CONTROLLED AXLE OF A VEHICLE

(71) Applicant: FAIVELEY TRANSPORT ITALIA S.p.A, PIOSSASCO (IT)

(72) Inventor: Roberto Tione, Lauriano (IT)

(73) Assignee: FAIVELEY TRANSPORT ITALIA S.P.A, Piossasco (IT)

( * ) Notice: Subject to any disclaimer, the term of this patent is extended or adjusted under 35 U.S.C. 154(b) by 448 days.

(21) Appl. No.: 16/064,245

(22) PCT Filed: Dec. 20, 2016

(86) PCT No.: PCT/IB2016/057813
§ 371 (c)(1),
(2) Date: Jun. 20, 2018

(87) PCT Pub. No.: WO2017/109690
PCT Pub. Date: Jun. 29, 2017

(65) Prior Publication Data
US 2019/0001822 A1   Jan. 3, 2019

(30) Foreign Application Priority Data

Dec. 22, 2015   (IT) .................. 102015000086465

(51) Int. Cl.
*B60L 3/10*  (2006.01)
*B60T 8/17*  (2006.01)
(Continued)

(52) U.S. Cl.
CPC .............. *B60L 3/106* (2013.01); *B60L 3/10* (2013.01); *B60T 8/172* (2013.01); *B60T 8/1705* (2013.01); *B60T 17/228* (2013.01); *B60Q 1/447* (2013.01)

(58) Field of Classification Search
CPC .......... B60L 3/106; B60L 3/10; B60T 17/228; B60T 8/172; B60T 8/1705; B60T 8/1761;
(Continued)

(56) References Cited

U.S. PATENT DOCUMENTS 4,818,037 A  *  4/1989  McEnnan ................ B60T 8/171
                                                   303/183
4,990,840 A  *  2/1991  Migda .................. G05B 19/184
                                                   318/571

(Continued)

FOREIGN PATENT DOCUMENTS

DE         3902846 A1      8/1990
DE    102009012128 A1  *  9/2010   .......... B60W 40/068
(Continued)

OTHER PUBLICATIONS

B. Widrow and S.D. Stearns, Adaptive Signal Processing, New Jersey, Prentice-Hall, Inc., 1985.

(Continued)

*Primary Examiner* — Fadey S. Jabr
*Assistant Examiner* — Mohamed Abdo Algehaim
(74) *Attorney, Agent, or Firm* — THE SMALL PATENT LAW GROUP LLC; Philip S. Hof

(57) ABSTRACT

The method comprises the steps of generating speed signals indicative of the angular speed of the wheels of said axle; generating an error signal indicative of the error or difference between a set point speed for the wheels, determined by means of a reference model, and the speed indicated by said speed signals; and generating a driving signal for torque-controlling apparatuses applied to the wheels of said axle, by adaptive filtering of an input signal which is a function of said set point speed, modifying parameters of the adaptive filtering as a function of said error signal, such as to make such speed error or difference tend to zero.

17 Claims, 7 Drawing Sheets

(51) Int. Cl.
  *B60T 8/172* (2006.01)
  *B60T 17/22* (2006.01)
  *B60Q 1/44* (2006.01)

(58) Field of Classification Search
  CPC .. B60T 8/17; B60Q 1/447; B60W 2050/0054;
       B60W 2050/0055; B60W 2050/0056;
       B60W 2050/0008; B60W 2050/0009;
       B60W 2050/00001; B60W 2050/0011;
       B60W 2050/0014; B60W 2050/0025;
       B60W 2050/0022; B60W 2050/0052;
       G05B 11/42; G05B 13/042; Y02T 10/72;
       G05F 1/00
  USPC ........................................................ 701/19
  See application file for complete search history.

(56) References Cited

U.S. PATENT DOCUMENTS

| | | | | |
|---|---|---|---|---|
| 5,253,172 A * | 10/1993 | Ito | ................ | B60K 28/16 180/400 |
| 5,334,983 A * | 8/1994 | Ikeda | ................ | B60T 8/173 342/70 |
| 7,317,978 B2 * | 1/2008 | Ashizawa | ................ | B60K 6/543 701/54 |
| 8,197,016 B2 * | 6/2012 | Metzger, Jr. | ................ | B60T 8/1703 303/155 |
| 8,645,011 B2 * | 2/2014 | Schaffler | ................ | B60L 3/10 701/20 |
| 9,463,873 B2 * | 10/2016 | Van Deventer | ................ | B64C 25/46 |
| 2004/0148077 A1 * | 7/2004 | Yasui | ................ | B60T 8/172 701/41 |
| 2005/0189886 A1 * | 9/2005 | Donnelly | ................ | B61C 15/12 318/52 |
| 2006/0025896 A1 * | 2/2006 | Traechtler | ................ | B60T 8/17552 701/1 |
| 2006/0108170 A1 * | 5/2006 | Ishikawa | ................ | B60T 8/171 180/282 |
| 2007/0001629 A1 * | 1/2007 | McGarry | ................ | B61C 15/14 318/52 |
| 2007/0222407 A1 * | 9/2007 | Sakamoto | ................ | B60W 30/20 318/611 |
| 2008/0091332 A1 * | 4/2008 | Yasui | ................ | F02D 41/40 701/102 |
| 2008/0116739 A1 * | 5/2008 | Lang | ................ | B60T 8/172 303/15 |
| 2008/0243348 A1 * | 10/2008 | Svendenius | ................ | B60T 8/172 701/90 |
| 2008/0285775 A1 * | 11/2008 | Christoph | ................ | H03G 3/32 381/99 |
| 2009/0164090 A1 * | 6/2009 | Yasui | ................ | F02D 41/1403 701/102 |
| 2010/0145567 A1 * | 6/2010 | Bian | ................ | B60T 8/172 701/31.4 |
| 2012/0016646 A1 * | 1/2012 | Takenaka | ................ | B60W 40/101 703/2 |
| 2012/0116617 A1 * | 5/2012 | Schaffler | ................ | B60L 3/10 701/20 |
| 2012/0189132 A1 * | 7/2012 | Sakamoto | ................ | G10K 11/178 381/71.4 |
| 2012/0224464 A1 * | 9/2012 | Kim | ................ | G05B 15/02 369/47.4 |
| 2013/0144500 A1 * | 6/2013 | Watanabe | ................ | B60T 8/26 701/73 |
| 2014/0074328 A1 * | 3/2014 | Schaffler | ................ | B60L 3/10 701/20 |
| 2014/0246282 A1 * | 9/2014 | Elstorpff | ................ | B60T 8/1705 188/165 |
| 2015/0005993 A1 * | 1/2015 | Breuing | ................ | G01S 13/60 701/19 |
| 2015/0112564 A1 * | 4/2015 | Yasui | ................ | B60T 13/586 701/70 |
| 2017/0174192 A1 * | 6/2017 | Ying | ................ | B60T 8/17616 |
| 2018/0001897 A1 * | 1/2018 | Brockley | ................ | B60K 28/16 |

FOREIGN PATENT DOCUMENTS

| | | |
|---|---|---|
| EP | 0089899 A1 | 9/1983 |
| EP | 2147840 A1 | 1/2010 |

OTHER PUBLICATIONS

International Search Report for PCT/IB2016/057813 dated Apr. 5, 2017.

* cited by examiner

METHOD AND SYSTEM FOR CONTROLLING AND RECOVERING ADHESION OF THE WHEELS OF A CONTROLLED AXLE OF A VEHICLE

CROSS-REFERENCE TO RELATED APPLICATIONS

This application is the U.S. National Stage Application of International Patent Application No. PCT/IB2016/057813, filed on Dec. 20, 2016, which claims priority Italian Patent Application No. 102015000086465, filed on Dec. 22, 2015 the contents of each of which is incorporated herein by reference in its entirety.

The present invention relates to a system for controlling and recovering the adhesion of the wheels of a controlled axle of a railway vehicle.

Electronic systems are installed on board most modern rail vehicles, which typically include wheel slide control subsystems, intended to intervene both when the vehicle is in the traction phase and when it is in the braking phase. These subsystems are known as anti-skid or anti-slide systems, or also WSP (Wheel Slide Protection) systems.

A system for controlling the adhesion of the wheels, in an anti-slip function, is schematically represented in FIG. 1 of the accompanying drawings, which refers to a vehicle with n controlled axles A1, A2, . . . , An. The axles A1, A2, . . . , An comprise a respective shaft S1, S2, . . . , Sn and a respective pair of wheels W1, W2, . . . , Wn integral in rotation to it.

The drawings generally illustrate only one of the wheels of each axle.

The WSP system of FIG. 1 comprises an electronic control unit ECU, typically based on microprocessor architecture, that receives tachometer signals relating to the angular speed of each axle A1, A2, . . . An from detectors SS1, SS2, . . . , SSn respectively associated with these axles. The electronic control unit ECU is also connected to the torque control apparatuses TC1, TC2, . . . , TCn, each associated with a respective axle A1, A2, . . . , An.

The electronic control unit ECU is provided to operate the modulation of the torque applied to each axle according to a predetermined algorithm if, in case of applying torque during traction or braking in a degraded adhesion situation, the wheels of one or more axles end up in a possible incipient slipping condition. Torque modulation is implemented in such a way as to prevent a total blocking of the axles, possibly so as to bring each axle into a situation of controlled sliding in view of recovering adhesion and in any case during the entire duration of the degraded adhesion situation.

FIG. 2 shows a block diagram illustrating the control implemented on a single axle: the error or difference $E(t)$ between the reference speed value $V_R(t)$ at which one wishes to slide the controlled axle A and the angular measured velocity $V_M(t)$ detected by the associated sensor SS and conditioned by an acquisition and processing module APM is applied as an input signal to a control module CM, which provides as output a driving signal $Y(t)$ to the torque control apparatus TC associated with the axle A.

FIG. 3 illustrates by way of non-limiting example a possible way to realize the torque control apparatus TC. Such apparatus comprises an electronic control and driving unit 100, which controls a solenoid valve group 101 including a charging solenoid valve 102 and a discharging solenoid valve 103. In the embodiment illustrated, these solenoid valves are three-way valves with two positions. The solenoid valve 102 is normally open, and the solenoid valve 103 is normally closed.

The output of the charging solenoid valve 102 is coupled, in a manner known per se, to a brake cylinder 104 associated with the axle A.

Under the control of the electronic unit 100 the valve group 101 allows one to selectively reduce, maintain or increase the command pressure supplied to the brake cylinder 104, within values comprised between the atmospheric pressure and the brake pressure coming from a conduit 113 connected to the charging solenoid valve 102. The unit 100 may be predisposed to control the pressure to the brake cylinder 104 in an open loop mode, delegating the closure of the control loop to a speed loop according to FIG. 2, or to control said pressure in a closed loop mode through a feedback achieved through the use of a pressure sensor 105.

An electric motor 106 is associated with the axle A, able to apply to such axle a torque, traction or brake, in accordance with a request for torque 107 applied to an inverter 108 that drives this electric motor. The torque to be applied to the axle A by means of the motor 106 corresponds to a request for torque 110, modified by a correction torque 111, variable between zero and the value of the torque 110. The torque 107 is positive in case of traction and negative in case of braking. A blending module 112, in case of slipping during braking, "blends" the request for modulation of the torque applied to the axle A between the pneumatic system and the regenerative system, in a predetermined manner.

The torque control apparatus illustrated in FIG. 3 may be made according to many variants known to those skilled in the art. For example, in the case of towed railway vehicles, or satisfying UIC regulations, which typically have pneumatic-type anti-slip systems completely isolated from the traction systems, the unit 100 is not driven by the blending module 112 through a modulation request 113, as is illustrated in FIG. 3, but directly by the control module CM of FIG. 2, through a torque modulation request 114 illustrated through a dashed line in FIG. 3.

The control module CM of FIG. 2 may operate according to algorithms achieved through state diagrams, or PID structures, or systems based on a fuzzy logic. These algorithms have the object of maintaining the axle, which is in a condition of incipient slipping, at a so-called "sliding" speed corresponding to a fraction of the vehicle's speed, such speed also being known as the set point speed. Such algorithms require parameter tuning procedures, in such a way as to make such algorithms stable, avoiding or at least limiting the oscillations of the system and, in the case of WSP systems, avoiding excessive oscillations of the controlled axle's instantaneous speed around the set point speed. The tuning of the aforementioned parameters is more precise and accurate the less the system variables vary around one of their standard values.

In the case of an adhesion control system, one of the variables that has a wide range of variation is the instantaneous friction force $F_a(t)=\mu(\delta) m g$, where m is the mass on the contact point between the wheel and the rail, g is the acceleration of gravity, $\mu$ is the adhesion coefficient and $\delta$ is the sliding, i.e. the value of the difference between the vehicle's speed and the wheel's tangential speed, divided by the vehicle's speed. The force $F_a(t)$ acts on the contact point between the wheel and the rail (FIG. 8).

The adhesion coefficient $\mu$ varies as a function of the sliding $\delta$ substantially in the way illustrated in the graph of FIG. 7. Under normal conditions of vehicle weight, pseudostatic ($\delta \approx 0$) $\mu$ values, such as to allow the slipping phenomena to start, are near to 0.09 and can drop to values around 0.01 or even less in the presence of wet leaves or mixtures of water and rust on the rails, i.e. undergoing variations on the order of 20 dB. Furthermore, in the case of certain contaminants, given a determined initial $\mu$ value ($\approx$0), the instantaneous value of $\mu(\delta)$, at the variation in real time of $\delta$, may undergo variations up to −6 dB, or higher.

Moreover, the mass m on the axle may vary between the tare weight and the full load weight, both statically and dynamically during slipping, due to the pitching of the carriage, with consequent redistribution of the weight between the two axles of the carriage.

In a simultaneous slipping condition of multiple axles, the so-called phenomenon of "rail cleaning" may occur: a slipping axle produces friction at the point of contact between the wheels and rails, thereby injecting energy and partially cleaning the rails themselves, increasing the $\mu$ value for the next axle. This phenomenon causes consecutive axles to "encounter" instant adhesion values different from each other.

One observes then that, as the speed decreases, the friction coefficient between the brake disk and the brake pad (in the case of disc brakes) or between the wheel and the block (in the case of block brakes) can vary considerably.

Finally, a system intended to manage a torque control by means of a plurality of actuators, such as that described with reference to FIG. 3, must adapt to different transfer functions and different time constants, in real time. The coexistence of these changes requires the implementation of a "non-rigid" tuning, such as to accept the entire spectrum of variations, with the consequence of not obtaining an accurate and responsive control to rapid environmental variations, or an adaptive tuning "mapped" through a "look-up table" of parameters selected in real-time as a function of one or more of the environmental variables, such as described in EP 2 147 840 A2.

EP 2 147 840 A1 describes a method for the control and the possible recovery of adhesion of the wheels of a controlled axle of a railway vehicle. Such a method comprises the generation of a first speed signal indicative of the actual angular speed of the wheels of said axle and of a second speed signal indicative of the actual vehicle speed. From these speed signals the value of the actual instantaneous sliding of the axle's wheels is calculated. The error or difference between the value of the actual instantaneous sliding and a desired sliding value is calculated as a function of the detected acceleration of the axle's wheels and the brake pressure imparted to the brake cylinders associated with these wheels. This sliding error or difference is used to generate a driving signal for the control means of the braking pressure. This driving signal is generated with the use of a PID-type control device, the parameters of which are modified as a function of the detected speed of the vehicle, these parameters being able to assume a plurality of respective predetermined discrete values for different ranges of vehicle speed values.

Further slip control systems for rail vehicles are described in DE 3902846 and EP 0 089 899.

In view of the technical context described above, an object of the present invention is to provide an improved method for controlling and possibly recovering the adhesion of the wheels of a controlled axle of a railway vehicle, making it possible in particular to correct in a continuous manner, in real time, the control parameters, allowing an adaptation to the instantaneous values of adhesion and weight of the vehicle.

This and other objects are achieved according to the invention with a method of which the salient features are defined in the appended claim 1.

In one implementation of the method, the aforementioned input signal is a signal representative of the set point speed for the axle's wheels.

In another embodiment of the method, said input signal is a signal representative of the aforementioned error or difference in speed.

Further features and advantages of the invention will become apparent from the detailed description that follows, implemented with reference to the accompanying drawings, wherein.

The method according to the present invention applies adaptive-type techniques to the tuning and the dynamic correction of the control parameters of the slipping of the wheels of an axle, such techniques being performed continuously over time, in real time and not based on vectors or parametric tables mapped previously.

The invention, for this object, uses a control technique based on adaptive filtering, as described for example in B. Widrow and S. D. Stearns, Adaptive Signal Processing, New Jersey, Prentice-Hall, Inc., 1985.

Various known types of adaptive filters are known, suitable for use in a method according to the invention. By way of non-limiting example, the present invention provides the use of adaptive filters known as LMS (Least Mean Square) filters. For an accurate description of the general properties, features, convergence criteria and the variants of implementation of LMS filters, please refer to the available literature or the previously cited reference text.

The adaptive filters used may consist of both FIR-type (Finite Impulse Response) structures, and IIR-type (Infinite Impulse Response) structures.

According to the current symbolism for describing an adaptive filter, X(t) and Y(t) shall designate the input and output of such a filter.

In the description that follows and in the accompanying drawings, the time variable t will be denoted by the letter T to indicate that such time is understood in a discrete sense, namely that the method/system operates for finite samples with a period T.

Figure 4:
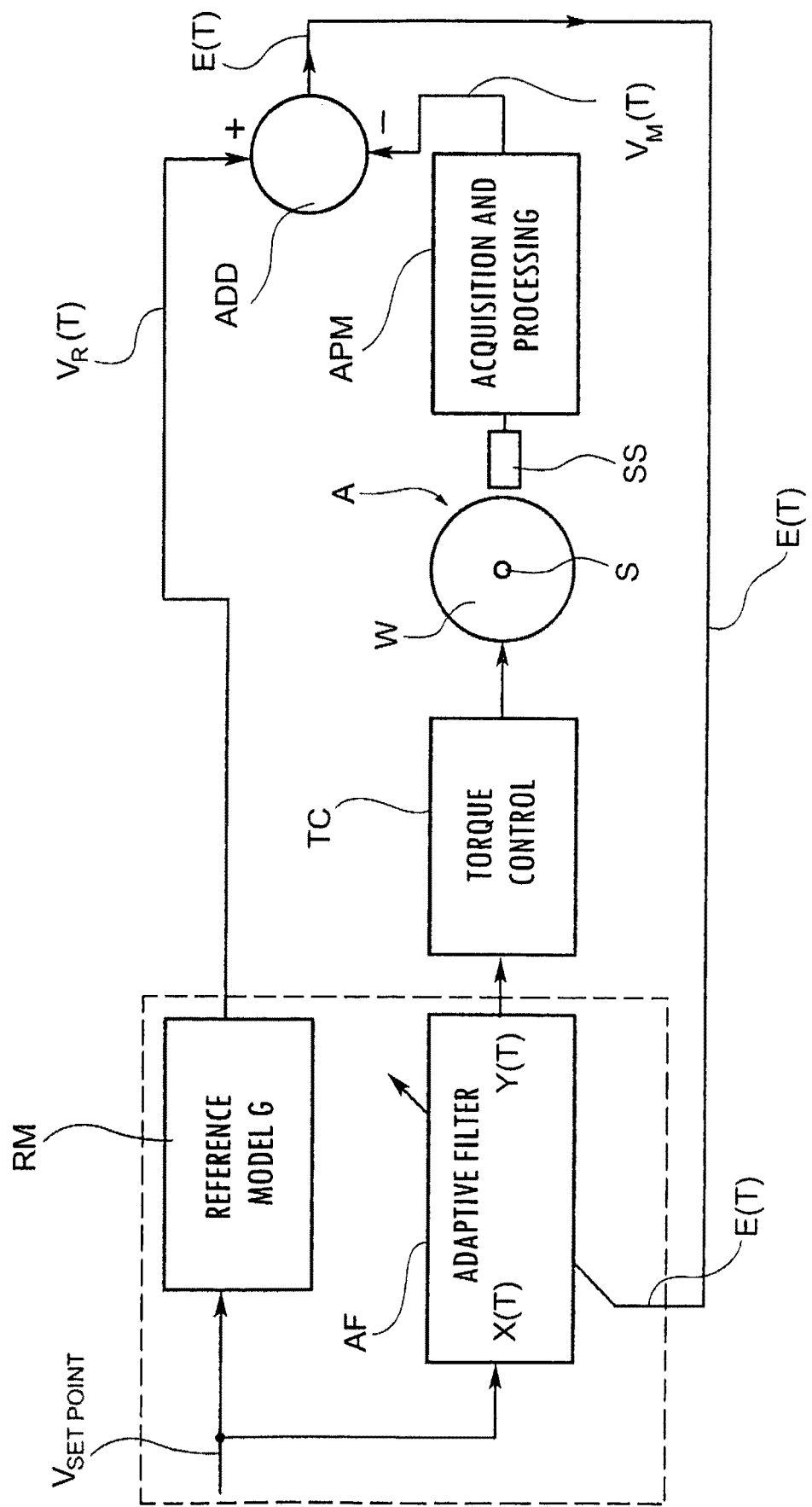
FIGS. 4, 5 and 6 are block diagrams of different ways of building systems for the implementation of a control method according to the present invention.

FIG. 4 shows a first control system schematically illustrated for implementing the method according to the present invention.

The system according to FIG. 4 comprises a block RM that represents a reference model that receives as input the set point speed $V_{SETPOINT}$ for the wheels W of the controlled axle A and which provides at its output the speed $V_R(t)$ of the axle A in response to the set point speed and its variations.

Figure 1:
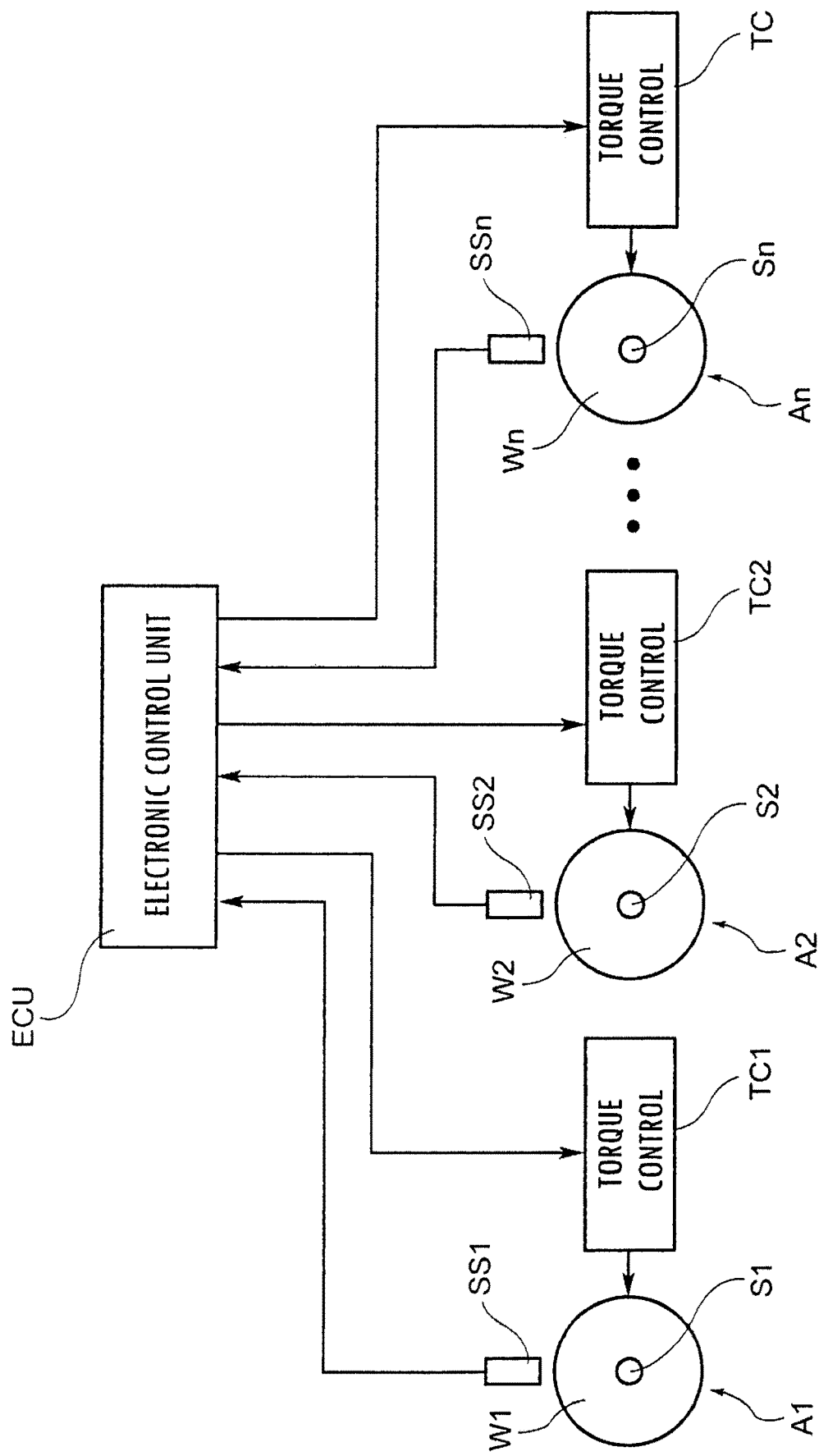
FIG. 1 is a block diagram of an anti-slip control system of the wheels of a railway vehicle.
Figure 2:
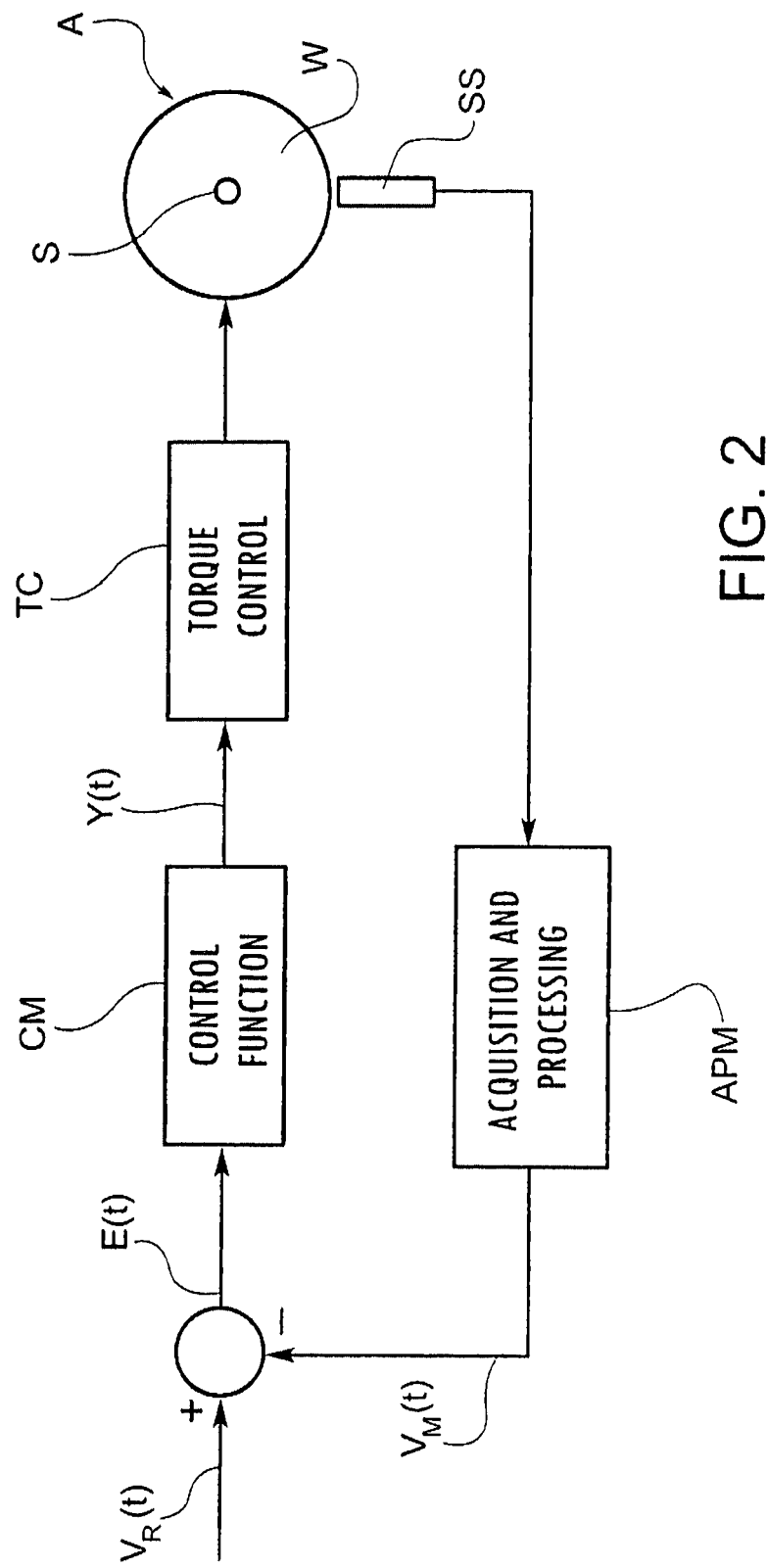
FIG. 2 is a block diagram of a closed loop control system of the axle's speed.
Figure 3:
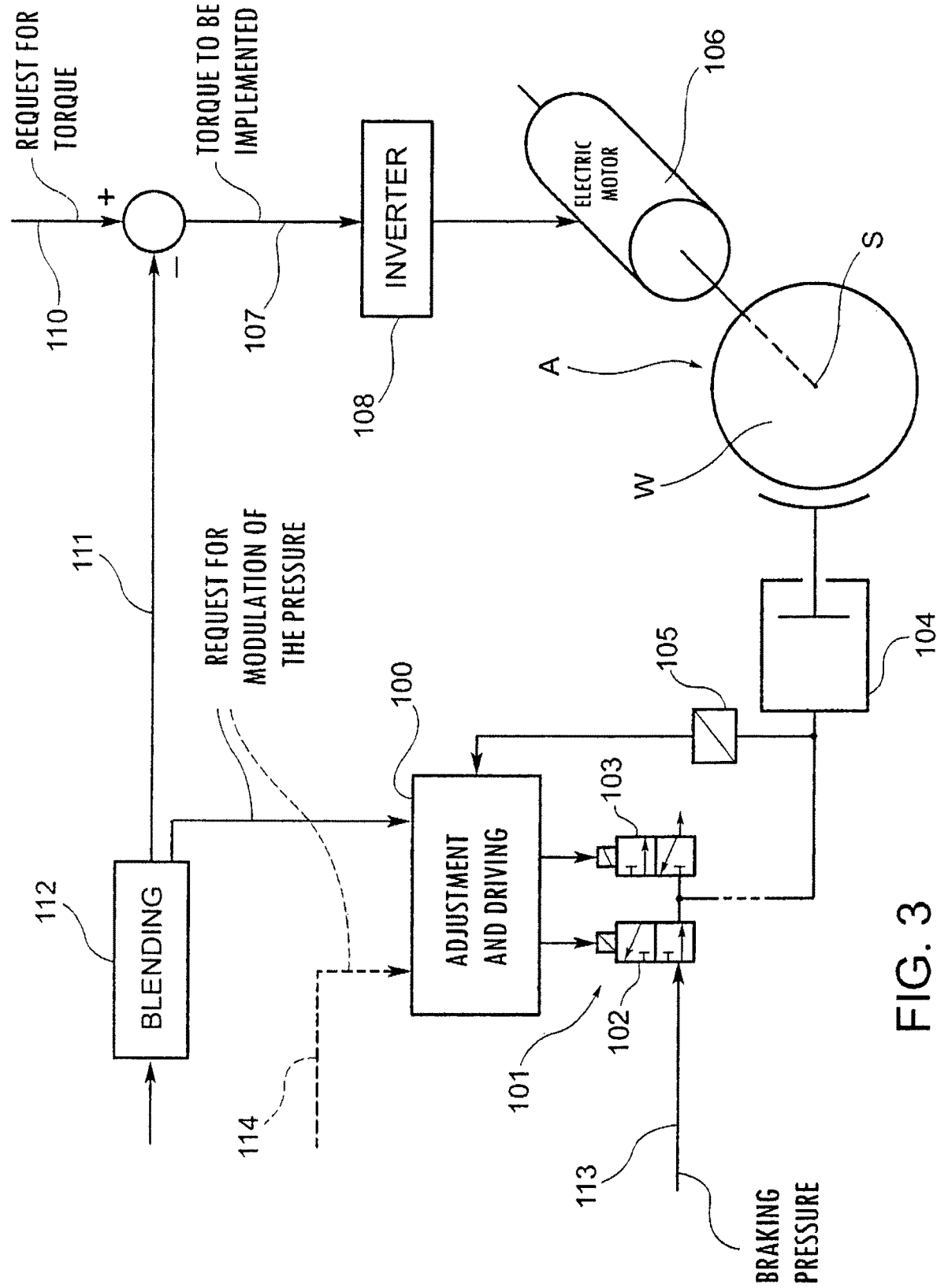
FIG. 3 is a diagram of a possible embodiment of an apparatus for controlling the torque applied to an axle.

The block RM has a transfer function G, which ideally is G=1. However, a more meaningful system, i.e. one adhering more to reality, for example (but not exclusively) a second order transfer function, approximating the expected model of the complex formed by the control module CM of the torque control apparatus TC and by the wheels W of FIG. 2.

In FIG. 4, AF indicates an adaptive filter, for example an LMS-type filter.

At the input X(T) of such filter AF a signal is supplied which is a function of the speed $V_{SETPOINT}$, for example, a signal proportional to the vehicle speed, typically between 65% and 95% of the vehicle's speed.

The output Y(T) of the adaptive filter AF is a signal for driving the torque control apparatus TC, which is in turn coupled to the axle A and its wheels W.

The output $V_R(T)$ of the block RM is applied to an input of an adder ADD, to another input from which arrives a signal $V_M(T)$ indicative of the angular speed of the axle A actually measured by means of an SS detector and an associated acquisition and processing module APM.

The adder ADD provides as its output an error signal E(T) indicative of the error or difference between the speed $V_R(T)$ and the measured speed $V_M(T)$, i.e. the difference between the expected speed at the output of the RM block and the speed $V_M(T)$.

The error signal E(T) is fed to the adaptive filter AF, where it is used to implement a continuous correction of the parameters of this filter, as long as this error E(T) tends to zero.

The stabilization of the coefficients or parameters of the adaptive filter AF can happen quickly if the input signal X(T) has a harmonic content equivalent to the bandwidth of the process to be controlled.

In the case of the system according to FIG. 4, the speed $V_{SETPOINT}$ is a signal with a practically null harmonic content and thus relatively unsatisfactory as regards the need for a rapid retuning of the parameters or coefficients of the filter AF. Such a solution may still be effectively used by initializing the coefficients of the filter AF to standard values, pre-calculated on the basis of an initial situation of compromise and subsequently, in the course of a slip phenomenon, the variations of the error E(T) at the input of the filter AF are sufficient to implement in real-time a proper correction of the coefficients or parameters of the filter.

Figure 5:
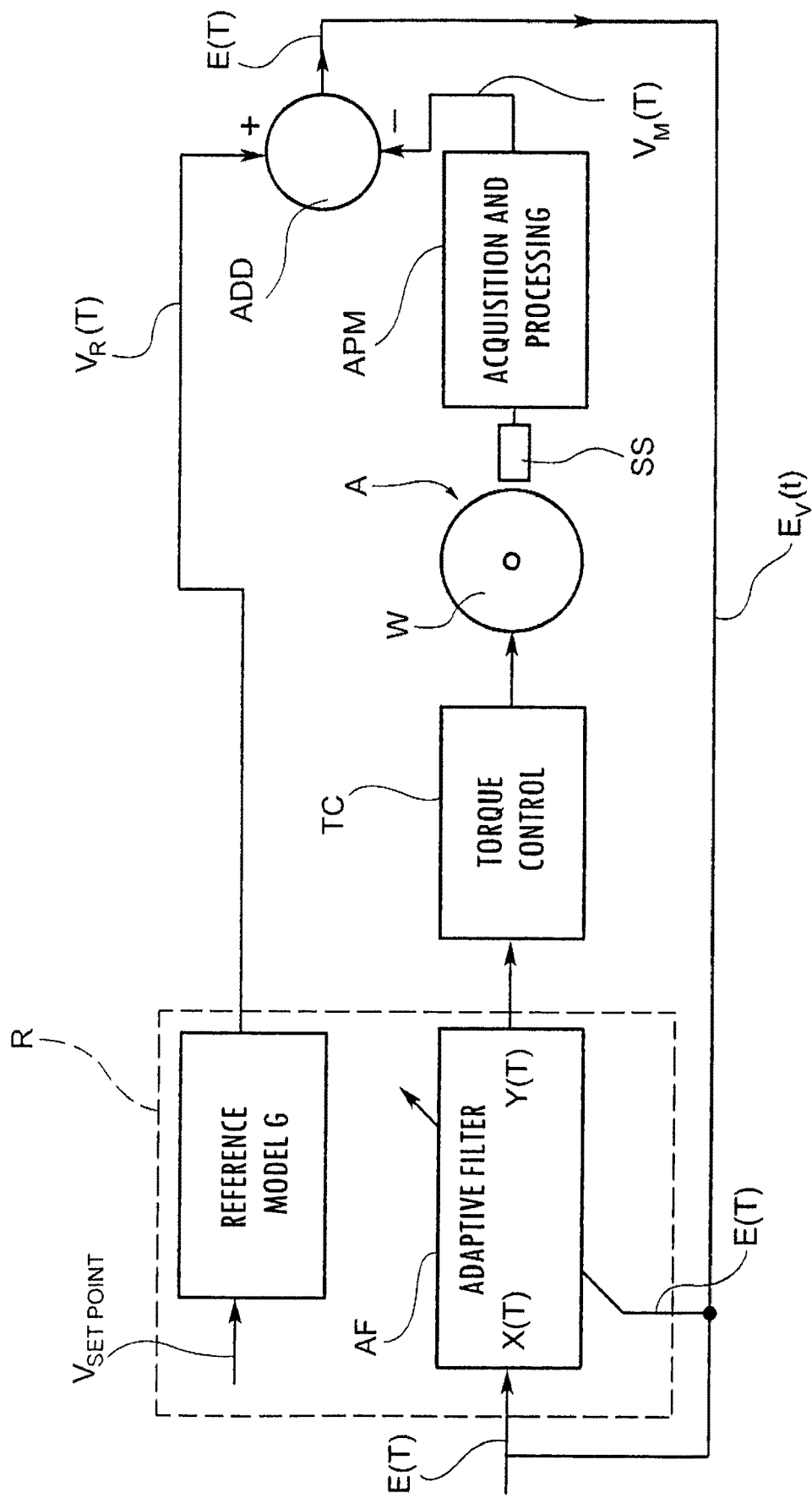

An alternative solution is illustrated in FIG. 5: the error E(T) is not only used as the correction factor of the adaptive algorithm implemented by the filter AF, but as input X(T) to the filter AF itself.

In fact, the error E(T) has an appropriate harmonic content for self-calibration of the filter AF and at the same time contains the information necessary for the generation of the corrections of the braking force acting on the controlled axle A.

The solution according to FIG. 5 allows a very fast dynamic calibration of the coefficients or parameters of the adaptive filter AF, even if initially these coefficients or parameters were completely zeroed.

As is known from the literature, the LMS-type adaptive filters can be realized both by using FIR structures and IIR structures.

The FIR structures are inherently stable, having no memory. However, this feature prevents the implementation of control functions having an integrative component, unless one uses the existing natural integrators downstream in the system, for example the natural integration represented by the braking cylinder.

Figure 6:
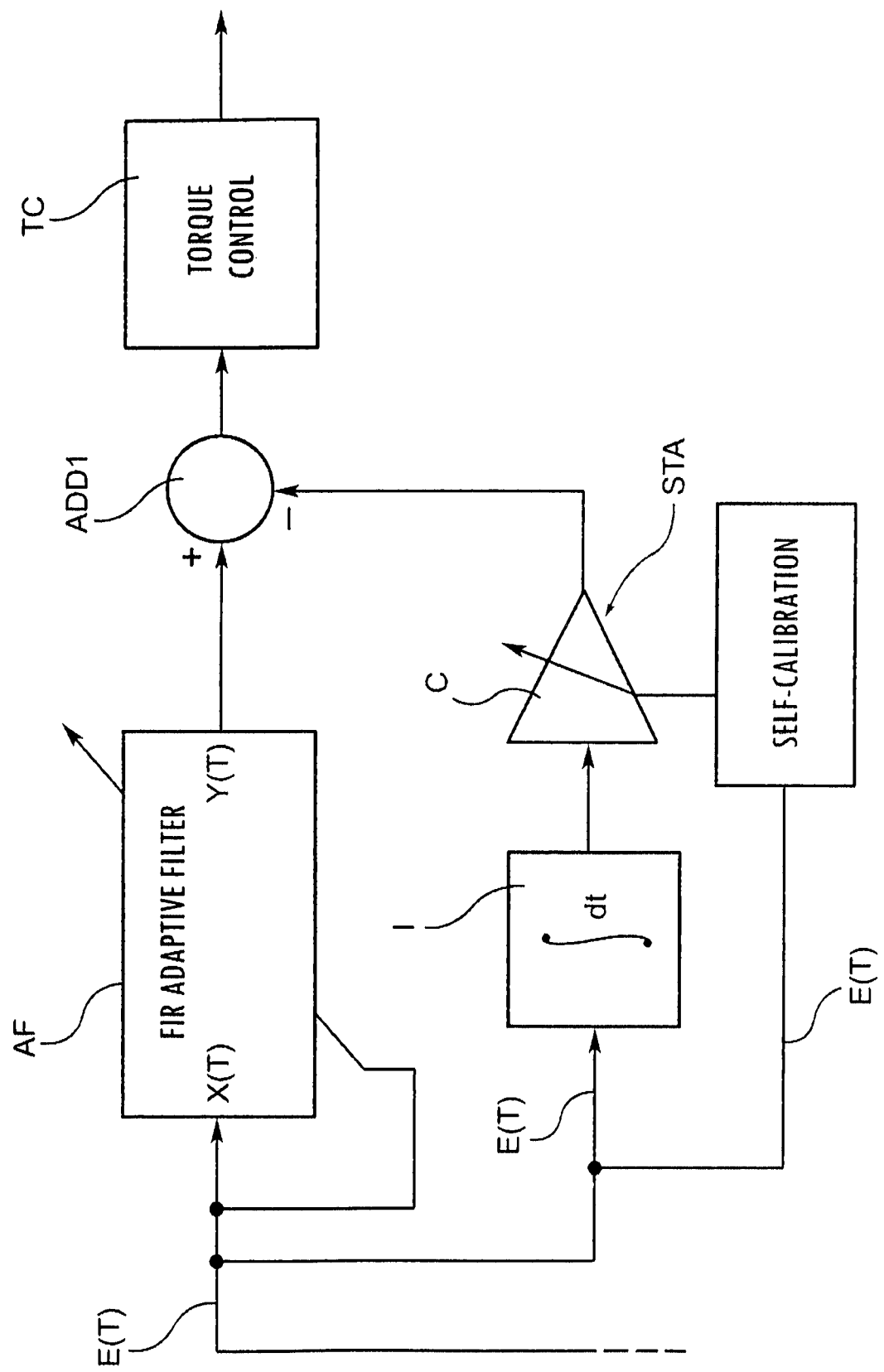
Figure 7:
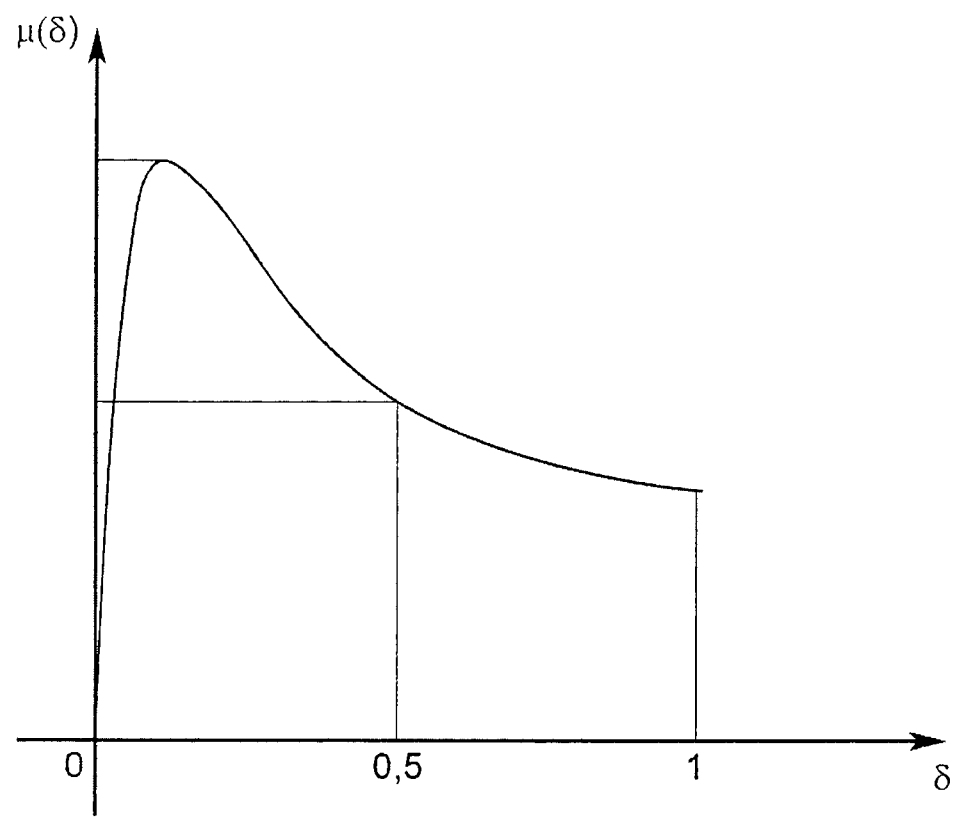
FIG. 7 is a graph showing qualitatively the trend of the adhesion coefficient $\mu$ of a wheel, shown on the y-axis, as a function of the sliding $\delta$, shown on the x-axis.
Figure 8:
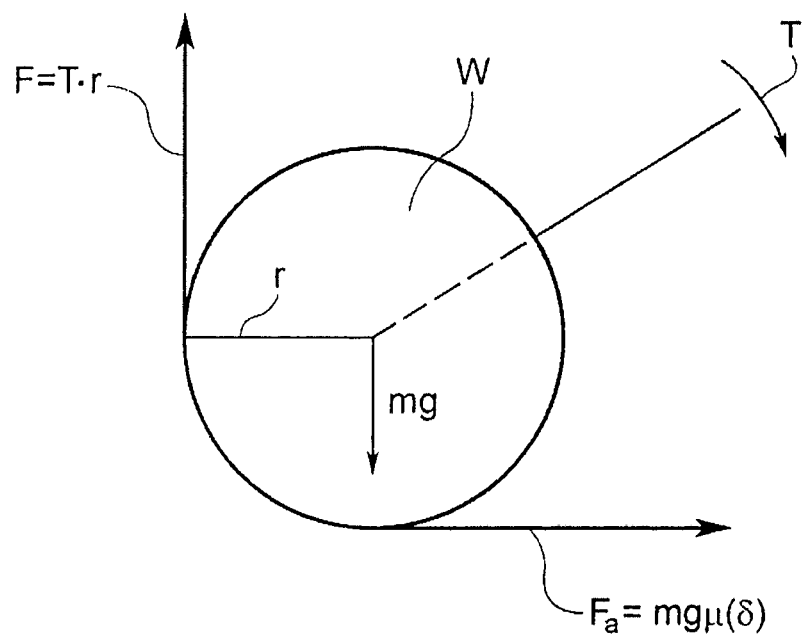
FIG. 8 is a diagram illustrating forces applied to an axle's wheel.

FIG. 6 illustrates an embodiment which allows one to overcome the lack of an integrative component in a LMS-type adaptive filter AF produced by an FIR structure. An integrator I is provided substantially in parallel to this adaptive filter AF, between the input of this filter and an adder ADD1, which receives the output of the filter AF and the output of the integrator I; the output of the adder ADD1 is connected to the torque control apparatus TC.

A self-tuning apparatus STA may optionally be associated with the integrator I and it includes a dedicated LMS-type cell C, connected between the output of the integrator I and the adder ADD1 and driven as a function of the error signal E(T).

In general, in the implementation of a control method according to the present invention, in order to avoid problems of deviations in the adaptive filter coefficients during the execution of the method, it is possible to limit the variation of the adaptive filter coefficients to a range of safety values stored in nonvolatile memory.

In order to maintain control always responsive to new variations of external parameters of the system, the leakage function characteristic of adaptive filters is appropriately used, to perform a continuous de-tuning of the coefficients or parameters of the filter when the error E(T) is close to zero, or in any case within the limits of variation of the coefficients or parameters such as to permit the recovery of a correct tuning of these coefficients or parameters as soon as they re-present significant E(T) values.

Also included in the scope of the present invention are implementations wherein one uses an adaptive filter made with an IIR-type structure, which may take a PID-type (Proportional-Integrative-Derivative) configuration.

Naturally, without altering the principle of the invention, the embodiments and the details of construction may vary widely with respect to those described and illustrated purely by way of non-limiting example, without thereby departing from the scope of the invention as defined in the appended claims.

The invention claimed is:

1. A method for controlling and recovering an adhesion of wheels of a controlled axle of a vehicle, the method comprising:
   generating speed signals indicative of an angular speed of the wheels of the controlled axle;
   generating an error signal indicative of a difference between the angular speed of the wheels and a reference speed of the wheels, the reference speed determined by means of a reference model based on a set point speed;
   modifying parameters of an adaptive filter based on the error signal to make the difference tend to zero, wherein the parameters of the adaptive filter that are modified are initialized with pre-calculated values stored in a non-volatile memory; and
   generating a driving signal as an output of the adaptive filter having the modified parameters, the driving signal communicated to a torque control apparatus for controlling a torque applied to the wheels of the controlled axle.

2. The method according to claim 1, further comprising inputting a signal that is a function of the set point speed to the adaptive filter, wherein the driving signal is generated based on the signal that is a function of the set point speed and the modified parameters of the adaptive filter.

3. The method according to claim 1, further comprising inputting the error signal as an input to the adaptive filter, wherein the driving signal is generated based on the error signal as the input and the modified parameters of the adaptive filter.

4. The method according to claim 1, wherein the adaptive filter has a FIR-type structure with a parallel integrator.

5. The method according to claim 4, wherein the driving signal provided by the parallel integrator is subjected to adaptive calibration.

6. The method according to claim 1, wherein the adaptive filter has an IIR-type structure.

7. The method according to claim 6, wherein the IIR-type structure of the adaptive filter has a PID-type configuration.

8. The method according to claim 1, wherein the parameters of the adaptive filter that are modified are limited in a pre-defined band of variation.

9. The method according to claim 1, further comprising decreasing the parameters of the adaptive filter that are modified in a continuous manner over time by means of a leakage function of the adaptive filter.

10. The method according to claim 1, wherein the set point speed corresponds to a designated percentage of a speed of the vehicle.

11. A system for controlling and recovering an adhesion of wheels of a controlled axle of a vehicle, the system comprising:
  a sensor configured to generate speed signals indicative of an angular speed of the wheels of the controlled axle;
  an adder device configured to generate an error signal indicative of a difference between the angular speed of the wheels and a reference speed of the wheels, the reference speed determined by means of a reference model based on a set point speed;
  an adaptive filter configured to receive the error signal and modify parameters of the adaptive filter based on the error signal to make the difference tend to zero, the adaptive filter further configured to receive the error signal as an input to the adaptive filter, wherein the adaptive filter is configured to generate a driving signal as an output of the adaptive filter based on the error signal as the input and the modified parameters of the adaptive filter; and
  a torque control apparatus configured to receive the driving signal and control a torque applied to the wheels of the controlled axle based on the driving signal.

12. The system of claim 11, wherein the adaptive filter has a FIR-type structure with a parallel integrator.

13. The system of claim 11, wherein the adaptive filter has an IIR-type structure.

14. The system of claim 13, wherein the IIR-type structure of the adaptive filter has a PID-type configuration.

15. The system of claim 11, wherein the parameters of the adaptive filter that are modified are limited in a pre-defined band of variation and are stored in a non-volatile memory.

16. The system of claim 11, wherein the adaptive filter includes a leakage function configured to decrease, in a continuous manner over time, the parameters of the adaptive filter that are modified.

17. A method for controlling and recovering an adhesion of the wheels of a controlled axle of a vehicle, the method comprising:
  receiving speed signals indicative of an angular speed of the wheels of the controlled axle;
  generating an error signal indicative of a difference between the angular speed of the wheels and a reference speed of the wheels, the reference speed determined by a reference model based on a set point speed which corresponds to a designated percentage of a speed of the vehicle;
  modifying parameters of an adaptive filter based on the error signal to make the difference tend to zero;
  inputting one of (i) a signal that is a function of the set point speed or (ii) the error signal to the adaptive filter, as an input to the adaptive filter; and
  generating a driving signal as an output of the adaptive filter based on both the input and the modified parameters, the driving signal communicated to a torque control apparatus for controlling a torque applied to the wheels of the controlled axle.

* * * * *